(12) United States Patent
Jess et al.

(10) Patent No.: US 8,762,771 B2
(45) Date of Patent: Jun. 24, 2014

(54) METHOD FOR COMPLETING WRITE OPERATIONS TO A RAID DRIVE POOL WITH AN ABNORMALLY SLOW DRIVE IN A TIMELY FASHION

(75) Inventors: Martin Jess, Erie, CO (US); Kevin Kidney, Lafayette, CO (US)

(73) Assignee: LSI Corporation, San Jose, CA (US)

( * ) Notice: Subject to any disclaimer, the term of this patent is extended or adjusted under 35 U.S.C. 154(b) by 369 days.

(21) Appl. No.: 13/289,741

(22) Filed: Nov. 4, 2011

(65) Prior Publication Data

US 2013/0117603 A1    May 9, 2013

(51) Int. Cl.
*G06F 11/00*    (2006.01)
(52) U.S. Cl.
USPC .................................................. 714/6.22
(58) Field of Classification Search
CPC .................................................. G06F 11/006
USPC ........................................................ 714/6.22
See application file for complete search history.

(56) References Cited

U.S. PATENT DOCUMENTS

| | | | |
|---|---|---|---|
| 5,742,752 A * | 4/1998 | DeKoning | 714/6.22 |
| 6,049,891 A * | 4/2000 | Inamoto | 714/6.12 |
| 6,067,635 A | 5/2000 | DeKoning et al. | |
| 7,055,058 B2 | 5/2006 | Lee et al. | |
| 7,386,663 B2 * | 6/2008 | Cousins | 711/114 |
| 7,424,574 B1 * | 9/2008 | Ahrens et al. | 711/114 |
| 7,529,967 B2 * | 5/2009 | Findleton et al. | 714/6.32 |
| 7,600,075 B2 * | 10/2009 | Cousins | 711/114 |
| 7,937,528 B2 * | 5/2011 | Cousins | 711/114 |
| 8,200,887 B2 * | 6/2012 | Bennett | 711/103 |
| 8,201,019 B2 * | 6/2012 | Durica et al. | 714/6.22 |
| 8,423,822 B2 * | 4/2013 | Sato | 714/6.3 |
| 8,595,595 B1 * | 11/2013 | Grcanac et al. | 714/770 |
| 2008/0250270 A1 * | 10/2008 | Bennett | 714/6 |
| 2011/0126045 A1 * | 5/2011 | Bennett | 714/6.22 |
| 2012/0072767 A1 * | 3/2012 | Nagpal et al. | 714/6.2 |
| 2012/0297258 A1 * | 11/2012 | Flynn et al. | 714/710 |

OTHER PUBLICATIONS

HP Smart Array Controller Technology, Technology brief, 4th edition, (c) Copyright 2010 Hewlett-Packard Development Company, L.P. TC110202TB, Feb. 2011, pp. 1-19.

* cited by examiner

*Primary Examiner* — Amine Riad
(74) *Attorney, Agent, or Firm* — Suiter Swantz pc llo

(57) ABSTRACT

The present invention is directed to a method for completing a stripe write operation in a timely fashion to a RAID drive pool which includes an abnormally slow drive. For example, the stripe write operation either completes within a required time interval, or an error is provided to the host/initiator which provides an indication to an application that the stripe write operation did not complete.

20 Claims, 5 Drawing Sheets

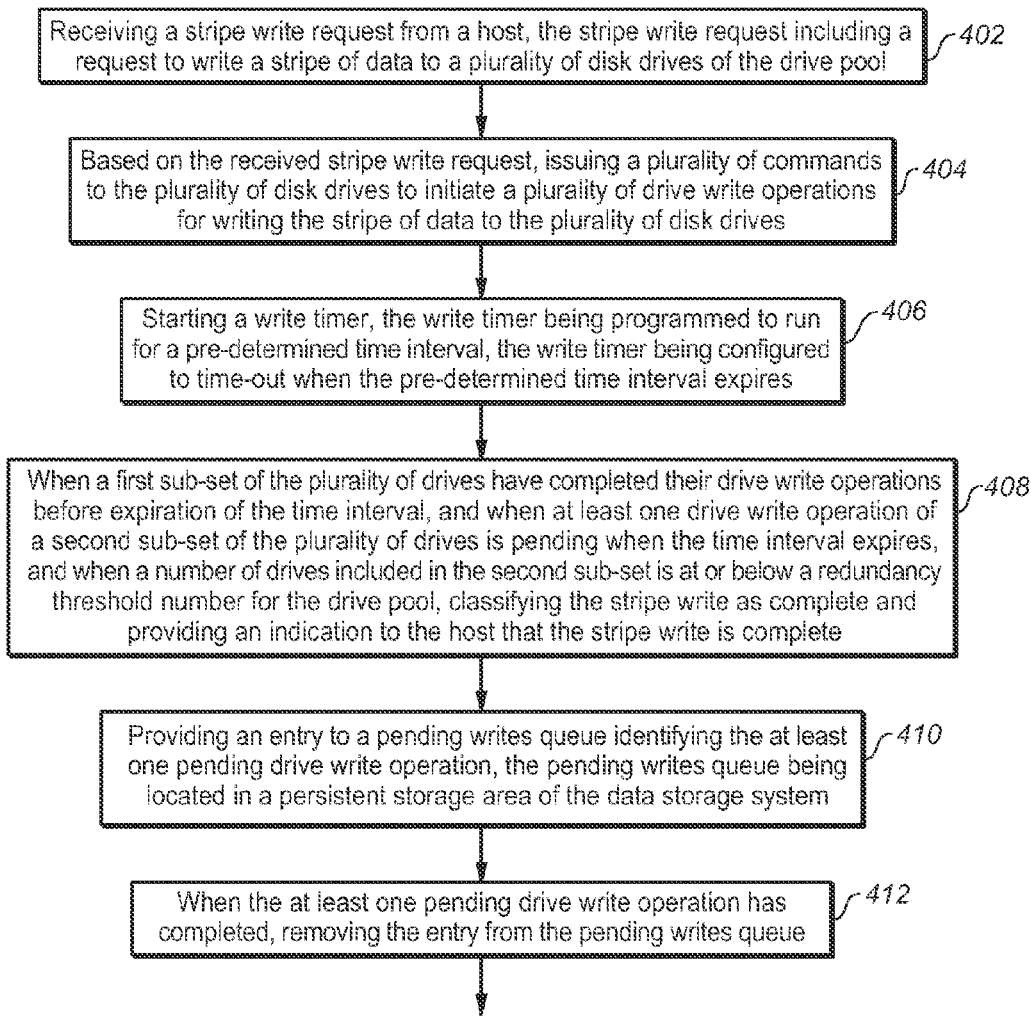

METHOD FOR COMPLETING WRITE OPERATIONS TO A RAID DRIVE POOL WITH AN ABNORMALLY SLOW DRIVE IN A TIMELY FASHION

FIELD OF THE INVENTION

The present invention relates to the field of data management via data storage systems and particularly to a method for completing write operations to a Redundant Array of Inexpensive Disks (RAID) drive pool with an abnormally slow drive in a timely fashion.

BACKGROUND OF THE INVENTION

Currently available methods for providing data management in data storage systems may not provide a desired level of performance.

Therefore, it may be desirable to provide a method(s) for providing data management in a data storage system which addresses the above-referenced shortcomings of currently available solutions.

SUMMARY OF THE INVENTION

Accordingly, an embodiment of the present invention is directed to a method for completing write operations to a drive pool (ex.—a non-zero redundancy level RAID drive pool) of a data storage system, the method including: receiving a stripe write request from a host, the stripe write request including a request to write a stripe of data to a plurality of disk drives of the drive pool; based on the received stripe write request, issuing a plurality of commands to the plurality of disk drives to initiate a plurality of drive write operations for writing the stripe of data to the plurality of disk drives; starting a write timer, the write timer being programmed to run for a pre-determined time interval, the write timer being configured to time-out when the pre-determined time interval expires; when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete; providing an entry to a pending writes queue identifying the at least one pending drive write operation, the pending writes queue being located in a persistent storage area of the data storage system; and when the at least one pending drive write operation has completed, removing the entry from the pending writes queue.

A further embodiment of the present invention is directed to a computer program product, including: a signal bearing medium bearing: computer-usable code configured for receiving a stripe write request from a host, the stripe write request being received at a storage controller of a data storage system, the stripe write request including a request to write a stripe of data to a plurality of disk drives of a drive pool of the data storage system; computer-usable code configured for based on the received stripe write request, issuing a plurality of commands to the plurality of disk drives to initiate a plurality of drive write operations for writing the stripe of data to the plurality of disk drives; computer-usable code configured for starting a write timer, the write timer being programmed to run for a pre-determined time interval, the write timer being configured to time-out when the pre-determined time interval expires; computer-usable code configured for, when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete; computer-usable code configured for providing an entry to a pending writes queue identifying the at least one pending drive write operation; and computer-usable code configured for, when the at least one pending drive write operation has completed, removing the entry from the pending writes queue.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which:

FIGS. 4A and 4B depict a flow chart illustrating a method for completing write operations, via a storage controller, to a drive pool of a data storage system in a timely manner when the drive pool includes an abnormally slow drive in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

A drive group is a collection of disk drives (ex.—physical drives) used for storing data of a Redundant Array of Inexpensive Disks (RAID) volume. The drive group may be assigned a RAID level, which may define a data organization and a redundancy model of the drive group. The RAID volume may be a host-accessible logical unit target for data input(s)/output(s) (I/Os). The drive group may contain multiple RAID volumes. All volumes (ex.—RAID volumes) within the drive group may use the same set of physical drives and function at the same RAID level.

Drives of the drive group may have different capacities. A usable capacity of the volume group (ex.—group of drives of the drive group upon which a volume is stored) is the RAID factor capacity based on the smallest drive in the group, excluding the region reserved for storage array configuration data. The free capacity of a drive group is the usable capacity minus the capacity of any defined volumes. Free drive group capacity may be used to create additional volumes or expand the capacity of the existing volumes.

The RAID volume may occupy a region on each drive in the drive group. The regions for the RAID volume may all have the same offset (in Logical Block Addresses (LBAs)) from the beginning of the drive and may all have the same length (in LBAs). Each such region that is part of the volume may be referred to as a piece. The collection of pieces for the volume may be referred to as a volume extent. A drive group may also have one or several free extents, each of the free extent(s) may consist of regions of unused capacity on the drive, and each may have the same offset and length.

The number of physical drives in a drive group is referred to as the drive group width. The drive group width affects both performance and accessibility for the RAID volumes in the drive group. The wider the drive group, the more physical spindles that can be deployed in parallel, thereby increasing performance for certain host I/O profiles. However, the wider the drive group, the higher the risk that one of the physical drives of the drive group will fail.

Segment size may be an amount of data that a controller writes to a single drive of the volume group before writing data to the next drive of the volume group. A stripe may be a collection of segments. The collection of segments may include one segment from each drive of the drive group, all with a same offset from the beginning of their drives. Thus, a volume may also be viewed as a collection of stripes.

Figure 1:
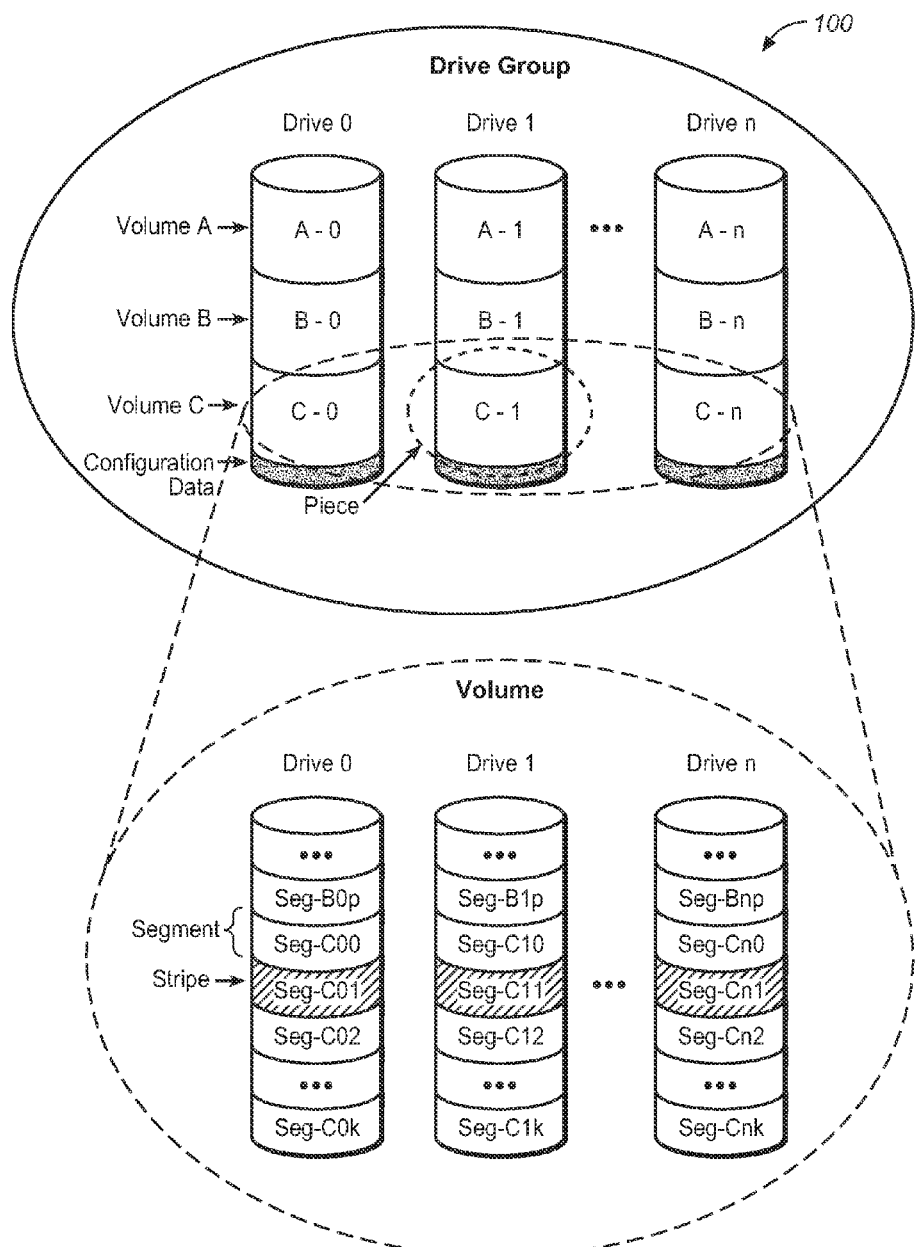
FIG. 1 is a block diagram schematic illustrating a drive group in accordance with an exemplary embodiment of the present disclosure.

Referring to FIG. 1, a drive group is shown, in accordance with an exemplary embodiment of the present disclosure. The drive group 100 may include a plurality of (ex.—n+1) drives, as shown. The drive group 100 may further store a plurality of volumes (ex.—the volumes being designated as "Volume A", "Volume B", "Volume C", as shown in FIG. 1). A first volume (ex.—"Volume C") stored on the drive group may include a plurality of (ex.—n+1) pieces (ex.—the pieces being designated as "C-0", "C-1", "C-n"). Each piece may contain/include a plurality of segments (the segments being designated as "Seg-C00", "Seg-C01", "Seg-C02" "Seg-C0*k*", etc., as shown in FIG. 1). In exemplary embodiments, a stripe may be stored across the drive group. For instance, the stripe may be formed by (ex.—may include) a plurality of segments (the segments being designated as "Seg-C01", "Seg-C11" and "Seg-Cn1", as shown in FIG. 1). Further, the first volume (ex.—"Volume C") may include a plurality of (ex.—k+1) stripes.

The drive group 100 (ex.—RAID layout) shown in FIG. 1 may be algorithmic in the sense that a simple calculation may be involved to determine which physical drive LBA on which drive of the drive group 100 corresponds to a specific RAID volume virtual LBA. The RAID volumes may be tightly coupled with the drive group 100 as the width of the drive group 100 may define the width of the RAID volumes, same for the RAID level.

More recent RAID layouts (ex.—RAID volumes on a drive group) may maintain the segment and stripe concepts, but different stripes may be on different drive sets and offsets may vary per segment. These more recent RAID layouts may have much lower reconstruction times when a drive fails, and may also have better load balancing among the drives as well. However, with these more recent (ex.—looser) RAID layouts, the concept of volume stripe writes may still apply, since these more recent RAID layouts may still write in segments, and since there is still a notion of a width (ex.—number of drives in a stripe).

Figure 2:
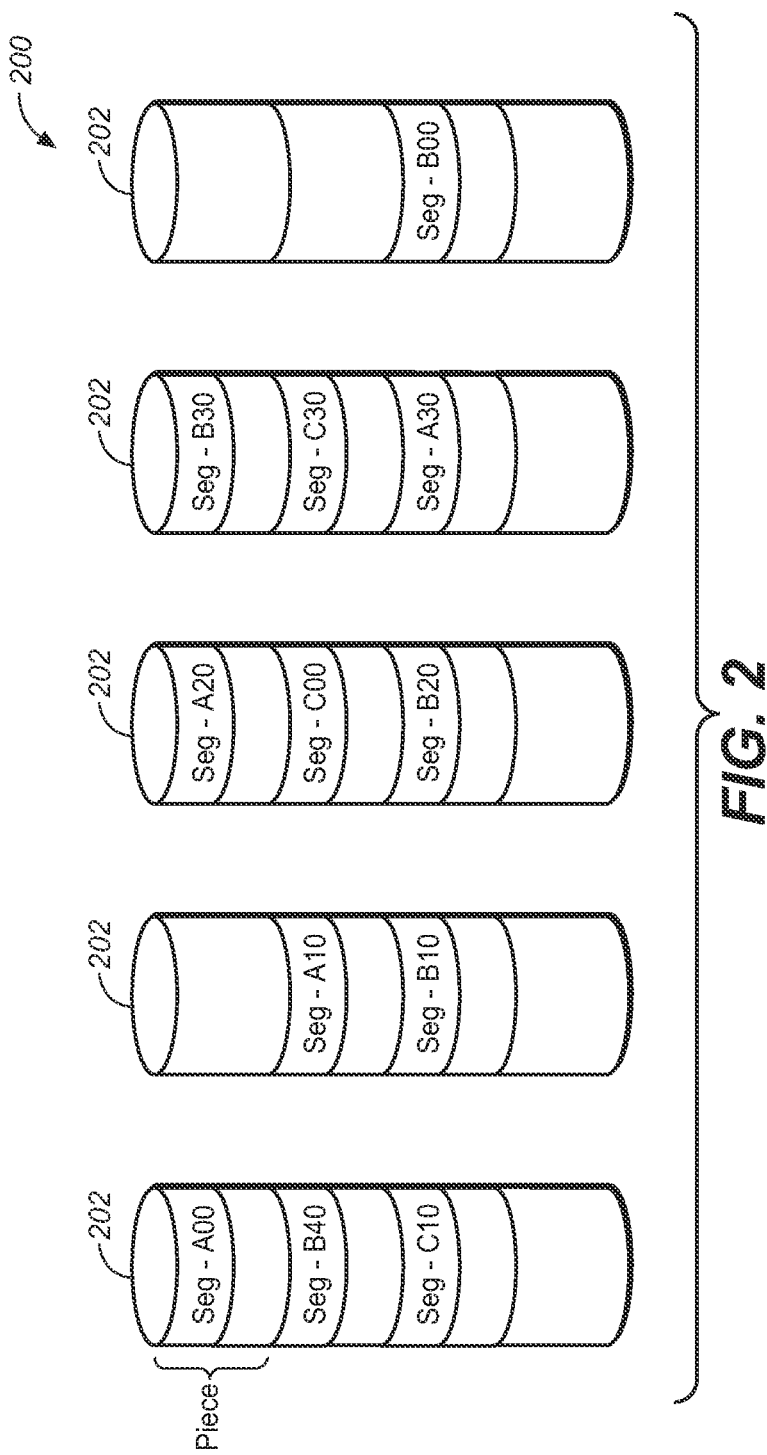
FIG. 2 is a block diagram schematic illustrating a Redundant Array of Inexpensive Disks (RAID) system, which may include a plurality of RAID volumes (and a plurality of volume stripes) stored across a plurality of drives of a drive group in accordance with a further exemplary embodiment of the present disclosure.

FIG. 2 illustrates an exemplary one of the aforementioned recent RAID layouts, which may include a plurality of RAID volumes (and a plurality of volume stripes) stored across a plurality of drives 202 of a drive group 200. In the illustrated drive group 200, a first volume stripe stored across the drive group 200 may include a first plurality of (ex.—four) segments (ex.—the segments being designated in FIG. 2 as "Seg-A00", "Seg-A10", "Seg-A20" and "Seg-A30") stored across multiple (ex.—four) drives of the drive group 200, thereby giving the first volume stripe a width equal to four. Further, a second volume stripe stored across the drive group 200 may include a second plurality of (ex.—five) segments (ex.—the segments being designated in FIG. 2 as "Seg-B00", "Seg-B10", "Seg-B20", "Seg-B30" and "Seg-B40") stored across multiple (ex.—five) drives of the drive group 200, thereby giving the second volume stripe a width equal to five. Still further, a third volume stripe stored across the drive group 200 may include a third plurality of (ex.—three) segments (ex.—the segments being designated in FIG. 2 as "Seg-C00", "Seg-C10" and "Seg-C20") stored across multiple (ex.—three) drives of the drive group 200, thereby giving the third volume stripe a width equal to three. Further, in the drive group 200 shown in FIG. 2, a single drive may contain multiple pieces of a same volume. Still further, the RAID layout (ex.—drive group; RAID organization) shown in FIG. 2 is not algorithmic and may require a mapping between volume LBAs and individual pieces. In the present disclosure, the generic term drive pool may be used to denote both the traditional drive group concept with the fixed piece and drive organization (as shown in FIG. 1) and the more recent dynamic RAID organization (shown in FIG. 2), which still includes segments and stripes, but eliminates the fixed piece offsets and drive association.

Sometimes, a physical drive within a storage system (ex.—within a drive pool of a storage system) may suddenly exhibit significantly lower write performance than other drives of the exact same model and manufacturer in the same storage system, but without actually failing. Further, this may not even be a persistent condition, but rather, a transient condition, where the write performance becomes very low for random periods of time but then returns to normal. In the present disclosure, the term abnormal drive may be used to refer to a drive exhibiting these random periods of significantly lower write performance. An abnormal drive may significantly affect overall write performance for any write operation that includes that drive. For example, a stripe write to a volume in a RAID drive pool which includes the abnormal drive may take as long as the write to the slowest physical drive in the drive group. Thus, a single abnormal drive in the storage array may significantly slow down stripe writes that include the abnormal drive. In some environments, such as media streaming, video processing, etc., this may cause significant issues, such as when long running operations have to be re-run. In extreme scenarios, the long running operations may take days or weeks to be re-run.

Existing solutions for dealing with the above-referenced abnormal drives involve measuring the average write performance of each drive of a drive pool and using that data to identify the drive(s) of the drive pool that are particularly slow and take corrective action, for example, by replacing the drive. A disadvantage associated with the above-referenced existing solutions is that it may be awhile after a drive has started misbehaving before that drive is actually identified as abnormal, and it may take even longer before the drive can be replaced. In the meantime, all writes involving the misbehaving drive may be slow and may cause significant problems for the user, such as in media streaming applications. Further, replacing slow drives may be very costly to a vendor as these drives often exhibit a no fault found (NFF) behavior, as power cycling the drive often alleviates the problem, at least temporarily.

Figure 3:
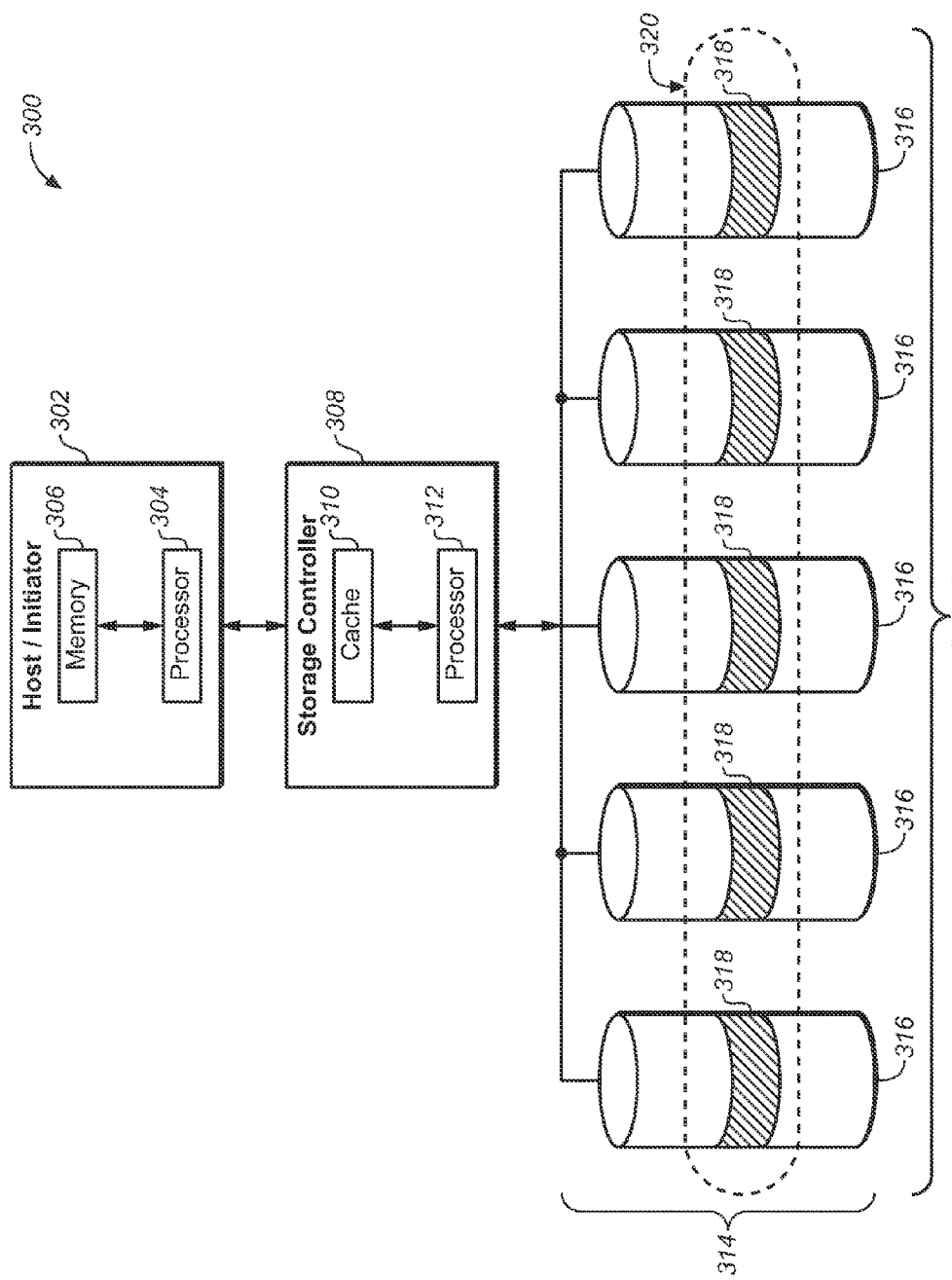
FIG. 3 is a block diagram schematic illustrating a data storage system in accordance with an exemplary embodiment of the present disclosure.

Referring to FIG. 3, a data storage system (ex.—external, internal/Direct-attached storage (DAS), RAID, software, enclosure, network-attached storage (NAS), Storage area network (SAN) system/network) in accordance with an exemplary embodiment of the present disclosure is shown. In exemplary embodiments, the data storage system 300 may include a host computer system (ex.—a host system; a host; a network host) 302. The host computer system 302 may include a processing unit (ex.—processor) 304 and a memory 306, the memory 306 being connected to the processing unit 304. In further embodiments, the system 300 may include one or more controllers (ex.—storage controller(s); disk array controller(s); Redundant Array of Independent Disks (RAID) controller(s); Communication Streaming Architecture (CSA) controllers; adapters). For instance, in an exemplary embodiment shown in FIG. 3, the data storage system 300 includes a single storage controller 308 communicatively coupled with the host 302. In embodiments in which the system 300 includes multiple storage controllers 308, the storage controllers 308 may be communicatively coupled with each other.

In exemplary embodiments of the present disclosure, the storage controller 308 may include a memory (ex.—controller cache; cache memory; cache) 310. The cache 310 of the storage controller 308 may include a plurality of buffers. The storage controller 308 may further include a processing unit (ex.—processor) 312, the processing unit 312 being connected to the cache memory 310. In further embodiments, the data storage system 300 may further include a storage subsystem (ex.—a drive pool) 314, the drive pool including a plurality of physical disk drives (ex.—hard disk drives (HDDs)) 316. The drive pool 314 may be connected to (ex.—communicatively coupled with) the storage controller 308. Further, the drive pool 314 may be configured for storing RAID volume data, and may be established in or configured as one of a number of various RAID levels or configurations, such as a RAID 3 configuration (ex.—RAID 3 level), a RAID 5 configuration (ex.—a RAID 5 level; RAID 5 parity) or a RAID 6 configuration (ex.—a RAID 6 level; RAID 6 parity).

As mentioned above, the drive pool 314 of the system 300 may be configured for storing RAID volume data. Further, as mentioned above, RAID volume data may be written to and stored as segments 318 across the drive pool 314. Further, the RAID volume data may also be read from the drive pool 314. For instance, as shown in the illustrated embodiment in FIG. 3, each drive 316 may store segment(s) 318 of the RAID volume data, the segments 318 collectively forming a stripe 320.

Figure 4B:
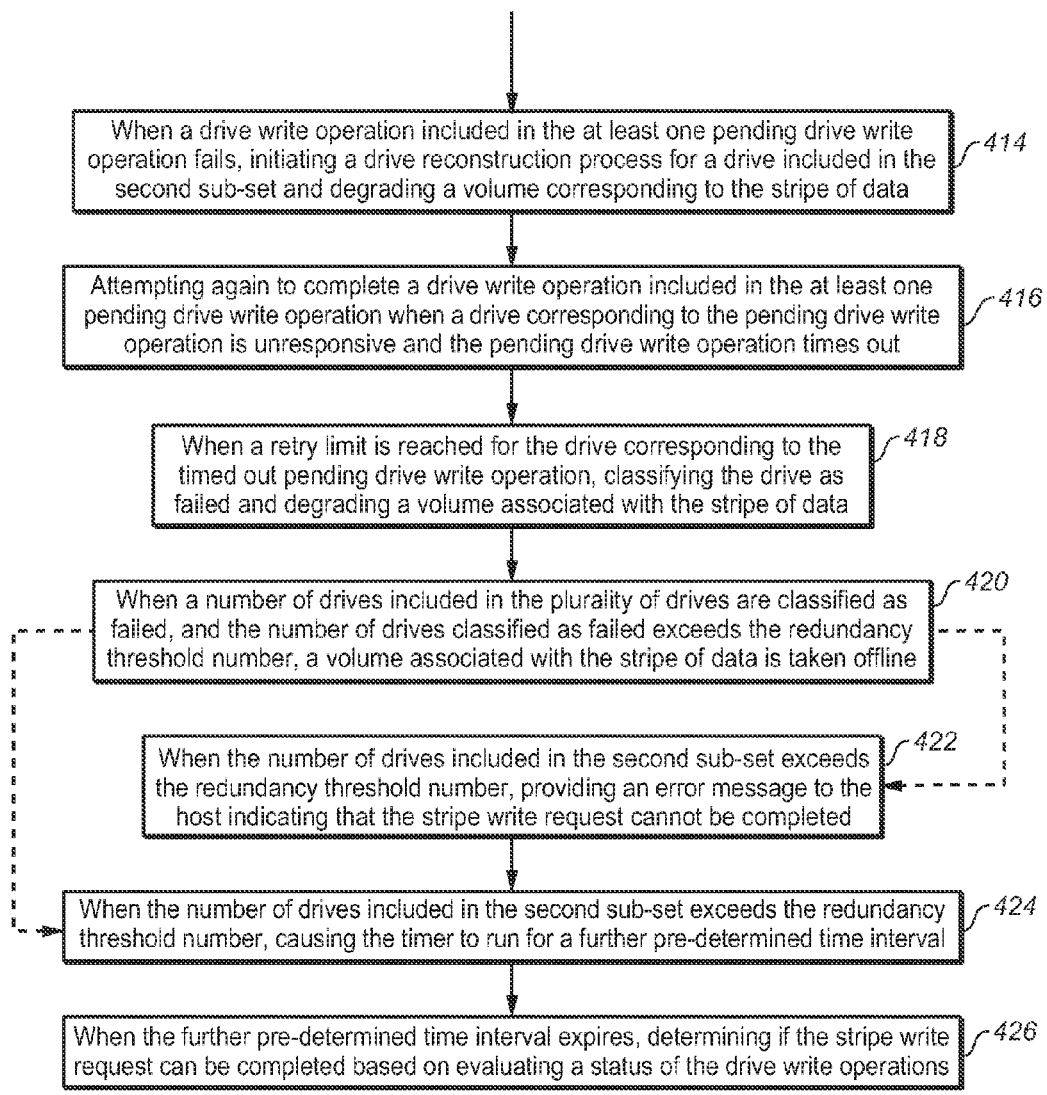

In FIGS. 4A and 4B, a flowchart is provided which illustrates a method for completing write operations, via a storage controller, to a drive pool of a data storage system (ex.—such as the system 300 shown in FIG. 3) in a timely manner when the drive pool includes an abnormally slow drive in accordance with an exemplary embodiment of the present invention. The method 400 may include the step of receiving an I/O request (ex.—a write request; a stripe write request) to write a stripe of data to a plurality of disk drives of a drive pool of the data storage system, the write request being generated by and/or received from an initiator (ex.—host system) 402. For example, as shown in FIG. 3, the request may be received by the storage controller 308 and the stripe of data (ex.—stripe data; stripe) 320 may be written to and stored across the plurality of physical disk drives 316 of the drive pool 314 as segments 318. In an exemplary embodiment of the present disclosure, the system 300 may be a RAID system 300, which may be configured in a non-zero RAID level (ex.—RAID 1, RAID 3, RAID 5, RAID 6, etc.) for allowing the method 400 described herein to take advantage of the inherent redundancy present in such RAID systems and RAID levels, as will be described herein.

The method 400 may further include the step of, based on the received stripe write request, issuing (ex.—providing; transmitting) a plurality of commands to the plurality of disk drives of the drive pool to initiate a plurality of drive write operations for writing the stripe of data to the plurality of disk drives 404. For instance, the storage controller 308, in response to receiving the host write request, may transmit a plurality of commands, the plurality of commands collectively initiating the process of writing to the drive pool 314 all of the stripe data 320 of (ex.—corresponding to) the host write request. For example, for the exemplary drive pool 314 shown in FIG. 3, a first command may be directed from the storage controller 308 to a first disk drive included in the drive pool 314 for initiating a first drive write operation for writing a first segment (designated as "Seg-1" in FIG. 3) of the host-specified stripe data to the first disk drive; a second command may be directed from the storage controller 308 to a second disk drive included in the drive pool 314 for initiating a second drive write operation for writing a second segment (designated as "Seg-2" in FIG. 3) of the host-specified stripe data to the second disk drive; a third command may be directed from the storage controller 308 to a third disk drive included in the drive pool 314 for initiating a third drive write operation for writing a third segment (designated as "Seg-3" in FIG. 3) of the host-specified stripe data to the third disk; a fourth command may be directed from the storage controller 308 to a fourth disk drive included in the drive pool 314 for initiating a fourth drive write operation for writing a fourth segment (designated as "Seg-4" in FIG. 3) of the host-specified stripe data; a fifth command may be directed from the storage controller 308 to a fifth disk drive included in the drive pool 314 for initiating a fifth drive write operation to obtain a fifth segment (designated as "Seg-5" in FIG. 3) of the host-specified stripe data. The plurality of drive write operations may collectively form or be referred to as a stripe write operation.

The method 400 may further include the step of starting (ex.—activating) a timer (ex.—a write timer), the write timer being set (ex.—programmed; pre-programmed) to run for a pre-determined time interval, the write timer being configured to time-out when the pre-determined time interval expires 406. For example, when the storage controller 308 provides the commands to the drive pool 314, the storage controller 308 may start/activate a timer (ex.—a lazy write timer). The timer may be configured and/or allowed by the storage controller 308 to run for a non-zero, finite duration of time (ex.—the pre-determined time interval) before/until the time interval expires, at which point, the timer may time-out (ex.—stop running). Further, activation of the timer may coincide with (ex.—occur at the same time as) commencement of the drive write operations (ex.—at the same time as the transmitting of the commands to the drive pool; at the time of initiation of the stripe write operation). For instance, when the stripe write operation is initiated by issuing the commands to N number of drives 316 (ex.—N may be a whole number integer having a value of two or greater, such as 5, the five drives being shown in FIG. 3), the lazy write timer may be started. If all N (ex.—five) of the drive write operations of the N (ex.—five) drives complete/are completed before the lazy write timer times out, the timer is simply cancelled (ex.—cleared; stopped; de-activated).

The method 400 may further include the step of, when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete 408. For instance, during the time interval, a first sub-set (ex.—four) of the drives 316 may complete their drive write operations (ex.—the stripe data may be written to the drives 316 and a good/complete status may be provided by the drives 316 to the storage controller 308). However, when the time interval expires, a second sub-set (ex.—one) of the drives 316 may not have completed its/their drive write operation(s), thus that/those drive write operation(s) may be considered pending. Further, the system 300 may have a redundancy threshold number. For instance, if the system is a RAID 6 system, the stripe redundancy (ex.—redundancy threshold number, M) may be two, such that the system can handle up to two of its drives being failed at one time and still maintain redundancy. In an exemplary embodiment, if the redundancy threshold number for the system 300 is two and, if, at the time the time interval expires, the number of pending drive write operations is equal to or less than the redundancy threshold number (ex.—is two or less), the storage controller 308 may classify the stripe write operation (ex.—stripe write) as complete and may provide an indication (ex.—a status message) to the host that the stripe write is complete. Thus, when the time interval of expires, if at least N–M (N minus M; M=stripe redundancy; M=redundancy threshold number) drives have returned their drive write operations, the stripe write operation may be classified as complete and an indication of such may be provided to the host/initiator 302.

The method 400 may further include the step of providing an entry to a pending writes queue identifying the at least one pending drive write operation, the pending writes queue being located in a persistent storage area of the data storage system 410. For instance, if the lazy write timer times out when at least N–M drive write operations have completed (ex.—returned a good status), but before the last M drive write operations have returned status, an entry may be inserted (ex.—by the storage controller 308) into a pending writes queue indicating which drive write operations (ex.— drive writes) are still pending. In exemplary embodiments, the pending writes queue may be stored in persistent storage of the system 300 so that it persists across reboots of the storage system controllers. In embodiments in which the system 300 is a high availability storage system with two or more controllers 308, each controller may have/may implement its own corresponding pending writes queue and any controller in the storage system may be able to access the pending writes queue of any other controller in the storage system regardless of whether the controller whose queue is being accessed is up and running (ex.—is powered on) or not. For example, a controller could keep its pending writes queue in a reserved area of the physical drives 316, such that it may be accessible to all controllers in the storage system. This makes it possible for the other controllers in the system to complete/recover any pending lazy writes if a controller fails while there are entries on the failed controller's pending writes queue. The pending writes queue should be stored in storage that is resilient to physical drive failures (ex.—some kind of RAID reserved area; or a shared non-volatile static random-access memory (NVSRAM) accessible to all controllers of the system). In further embodiments, a single shared pending writes queue may be implemented in the storage system which may be accessible to/by all controllers of the storage system.

The method 400 may further include the step of, when the at least one pending drive write operation has completed (ex.—successfully completed), removing the entry from the pending writes queue 412. For instance, if the drive write operation(s) which are pending at expiration of the time interval eventually succeed and are completed, the pending writes queue entry/entries for that/those drive write operation(s) is/are simply removed from the pending writes queue.

In further embodiments, the method 400 may further include the step of, when a drive write operation included in the at least one pending drive write operation fails, initiating a drive reconstruction process for a drive included in the second sub-set and degrading a volume corresponding to the stripe of data 414. For example, a drive write operation which is pending at expiration of the time interval explicitly fails, the corresponding drive is considered failed, recovery (ex.— drive reconstruction) may be initiated, and a volume corresponding to the stripe of data and/or the failed disk is degraded. Eventually, the drive writes which are pending either: complete successfully, fail (ex.—explicitly fail) or timeout (ex.—the term "timeout" as used is in this sentence refers to a second level time-out that detects unresponsive drives where the storage controller 308 gets no response (ex.—no success indication, no failure indication) from the drive 316.

In further embodiments, the method 400 may further include the step of, attempting again to complete a drive write operation included in the at least one pending drive write operation when a drive corresponding to the pending drive write operation is unresponsive and the pending drive write operation times out 416. The method 400 may further include the step of, when a retry limit is reached for the drive corresponding to the timed out pending drive write operation, classifying the drive as failed and degrading a volume associated with the stripe of data 418. The method 400 may further include the step of, when a number of drives included in the plurality of drives are classified as failed, and the number of drives classified as failed exceeds the redundancy threshold number, a volume associated with the stripe of data is taken offline 420. For instance, if one of the pending drive writes times out (ex.—experiences the second level time-out), it is normally retried unless a retry limit has been reached, in which case, the drive is failed and the volume becomes degraded. If more drives than the stripe redundancy, M, are classified (ex.—marked) as failed in this manner, a volume associated with the stripe data and/or associated with these failed drives may go offline If the lazy write timer expires (ex.—if the time interval expires) before N–M drive writes have returned a good status (ex.—have completed), where M=stripe redundancy (ex— M=redundancy threshold number), it may not be possible to perform the lazy write completion and return a good status to the initiator 302. Depending on the requirements of the initiator and/or application, there are a number of possibilities. In an embodiment of the present disclosure, the method 400 may further include the step of, when the number of drives included in the second sub-set exceeds the redundancy threshold number, providing an error message to the host indicating that the stripe write request cannot be completed 422. For instance, an error message for the stripe write may be provided to the initiator 302 even though it may not actually be known at that time whether the stripe write would succeed or not. For some applications, this would be better than letting the stripe write wait. Alternatively, the method 400 may further include the step of, when the number of drives included in the second sub-set exceeds the redundancy threshold number, causing the timer to run for a further pre-determined time interval 424. The method 400 may further include the step of, when the further pre-determined time interval expires, determining if the stripe write request can be completed based on evaluating a status of the drive write operations 426. For instance, if the lazy write timer expires before N−M drive writes have returned a good status/have completed, the lazy write timer may be re-started (ex.—by the storage controller 308) and programmed to run for a second pre-determined time interval, thereby allowing more time for pending drive write operations to complete, so that, when the second pre-determined time interval expires, at least N−M drive writes will have completed, and the storage controller 308 may classify the stripe write operation (ex.—stripe write) as complete and may provide an indication (ex.—a status message) to the host that the stripe write is complete.

As mentioned above, the redundancy threshold value, M, may be equal to the stripe redundancy. However, in alternative embodiments, the redundancy threshold value may be established (ex.—selectively established by a user) such that it is less than the stripe redundancy. For example, with a RAID 6 system, although the stripe redundancy may have a value=2, M may be established at a value=1, so that the storage controller 308 may classify a stripe write operation as complete and/or provide a status message to the host 302 that the stripe write operation is complete only if all but one of the N drives (rather than all but two of the N drives) have completed their drive write operations when the time interval expires. This allows for a less aggressive lazy write approach, which allows for some redundancy to be left in the stripe 320 while the last drive write operation is pending. When M=2 (the more aggressive approach), the stripe write operation may be classified as complete sooner, but there is no redundancy left in the stripe 320 until at least one of the two remaining drive write operations completes successfully. With RAID 5 systems, stripe redundancy=1, so the less aggressive setting/approach is not possible in RAID 5 systems.

Further, whenever the lazy write timer expires, the storage controller 308 may increment a counter for each drive 316 that still has a drive write operation pending. This allows the system 300 to keep track of drives that do not respond within the lazy write timer interval. A user may choose to power cycle or replace a physical drive having an unusually high count of such timeouts.

The method(s) of the present disclosure allow for stripe write operations to complete within a predictable period of time (ex.—within the lazy write time-out interval), even if the system 300 has one or more abnormally slow drives (ex.— depending on the stripe redundancy) within the stripe write's drive set. Also, lazy writes may be recovered/completed even if a controller 308 and/or a physical drive 316 fails. Predictable stripe write performance is very important for media streaming applications such as video/film production and broadcast. With the method(s) of the present disclosure, stripe writes (ex.—stripe write operations) either complete within the required time or return an error that lets the application know that the stripe write didn't complete. Thus, the application does not have to hang for an extended period of time.

Further, the method(s) of the present disclosure may take advantage of the inherent redundancy in non-zero RAID levels (RAID 1, 3, 5, 6, etc.) by completing a full stripe write without having to wait for the slowest drive involved in the stripe write to respond. This may be particularly advantageous in media streaming where stripe write operations have to be completed within a certain timer interval (ex.—32 milliseconds (ms); approximately 30 frames per second).

The above-referenced method(s) of the present disclosure illustrate steps which may occur when the system 300 (ex.— volume) is configured in write through (WT) mode. In WT mode, the host 302 writes a whole stripe and a status is not returned to the host 302 until the write data (ex.—stripe data) is persisted on the drives 316. In further embodiments, the method(s) and system(s) described herein may be adapted to/configured for a write back (WB) mode. For example, the system 300 (ex.—volume) may be configured in WB mode such that the storage controller 308 may generate a write request and may flush a whole stripe (ex.—stripe data; write data) associated with that write request to the drives 316 so that the blocks (ex.—buffers) of the cache 310 may be marked as clean and possibly used for other writes, reads, etc. Further, in WB mode, a return status may be provided to the host 302 as soon as the write data has been inserted into (ex.—received by) the cache 310 of the storage controller 308, then, at some later time, the storage controller 308 may flush the data to the drives to persist it. Still further, in WB mode, rather than providing an indication to the host 302 that the stripe write is complete, the storage controller 308 may just mark blocks of the cache 310 as being clean, which may be important for freeing up cache memory for other writes, reads, etc. Further, in WB mode, rather than having a timer per stripe write (as discussed above), a timer per drive write may be established, as it may be desirable to only allow a certain amount of time for a drive to complete its write operation. Still further, whether WT mode or WB mode is implemented, abnormal drives may be worked around by leveraging the redundancy of the stripe as described above.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for completing write operations to a drive pool of a data storage system, the method comprising:
   receiving a stripe write request from a host, the stripe write request including a request to write a stripe of data to a plurality of disk drives of the drive pool;
   based on the received stripe write request, issuing a plurality of commands to the plurality of disk drives to initiate a plurality of drive write operations for writing the stripe of data to the plurality of disk drives;
   starting a write timer, the write timer being programmed to run for a pre-determined time interval, the write timer being configured to time-out when the pre-determined time interval expires; and
   when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete.

2. A method as claimed in claim 1, further comprising:
   providing an entry to a pending writes queue identifying the at least one pending drive write operation, the pending writes queue being located in a persistent storage area of the data storage system.

3. A method as claimed in claim 2, when the at least one pending drive write operation has completed, removing the entry from the pending writes queue.

4. A method as claimed in claim 1, when a drive write operation included in the at least one pending drive write operation fails, initiating a drive reconstruction process for a drive included in the second sub-set and degrading a volume corresponding to the stripe of data.

5. A method as claimed in claim 1, further comprising:
   attempting again to complete a drive write operation included in the at least one pending drive write operation when a drive corresponding to the pending drive write operation is unresponsive and the pending drive write operation times out.

6. A method as claimed in claim 5, further comprising:
   when a retry limit is reached for the drive corresponding to the timed out pending drive write operation, classifying the drive as failed and degrading a volume associated with the stripe of data.

7. A method as claimed in claim 2, further comprising:
   when a number of drives included in the plurality of drives are classified as failed, and the number of drives classified as failed exceeds the redundancy threshold number, a volume associated with the stripe of data is taken offline.

8. A method as claimed in claim 1, further comprising:
   when the number of drives included in the second sub-set exceeds the redundancy threshold number, providing an error message to the host indicating that the stripe write request cannot be completed.

9. A method as claimed in claim 1, further comprising:
   when the number of drives included in the second sub-set exceeds the redundancy threshold number, causing the timer to run for a further pre-determined time interval.

10. A method as claimed in claim 9, further comprising:
    when the further pre-determined time interval expires, determining if the stripe write request can be completed based on evaluating a status of the drive write operations.

11. A method as claimed in claim 1, wherein the drive pool is a non-zero redundancy level Redundant Array of Inexpensive Disks (RAID) drive pool.

12. A computer program product including computer readable instructions stored on a non-transitory computer readable medium executable by a processor, comprising:
    computer-usable code configured for receiving a stripe write request from a host, the stripe write request being received at a storage controller of a data storage system, the stripe write request including a request to write a stripe of data to a plurality of disk drives of a drive pool of the data storage system;
    computer-usable code configured for based on the received stripe write request, issuing a plurality of commands to the plurality of disk drives to initiate a plurality of drive write operations for writing the stripe of data to the plurality of disk drives;
    computer-usable code configured for starting a write timer, the write timer being programmed to run for a pre-determined time interval, the write timer being configured to time-out when the pre-determined time interval expires; and
    computer-usable code configured for, when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete.

13. A computer program product as claimed in claim 12, the signal-bearing medium further bearing:
    computer-usable code configured for providing an entry to a pending writes queue identifying the at least one pending drive write operation.

14. A computer program product as claimed in claim 13, the signal-bearing medium further bearing:
    computer-usable code configured for, when the at least one pending drive write operation has completed, removing the entry from the pending writes queue.

15. A computer program product as claimed in claim 12, the signal-bearing medium further bearing:
    computer-usable code configured for, when a drive write operation included in the at least one pending drive write operation fails, initiating a drive reconstruction process for a drive included in the second sub-set and degrading a volume corresponding to the stripe of data.

16. A computer program product as claimed in claim 12, the signal-bearing medium further bearing:
    computer-usable code configured for attempting again to complete a drive write operation included in the at least one pending drive write operation when a drive corresponding to the pending drive write operation is unresponsive and the pending drive write operation times out; and
    computer-usable code configured for, when a retry limit is reached for the drive corresponding to the timed out pending drive write operation, classifying the drive as failed and degrading a volume associated with the stripe of data.

17. A computer program product as claimed in claim 13, the signal-bearing medium further bearing:
computer-usable code configured for, when a number of drives included in the plurality of drives are classified as failed, and the number of drives classified as failed exceeds the redundancy threshold number, a volume associated with the stripe of data is taken offline.

18. A computer program product as claimed in claim 13, the signal-bearing medium further bearing:
computer-usable code configured for, when the number of drives included in the second sub-set exceeds the redundancy threshold number, providing an error message to the host indicating that the stripe write request cannot be completed.

19. A computer program product as claimed in claim 13, the signal-bearing medium further bearing:
computer-usable code configured for, when the number of drives included in the second sub-set exceeds the redundancy threshold number, causing the timer to run for a further pre-determined time interval; and
computer-usable code configured for, when the further pre-determined time interval expires, determining if the stripe write request can be completed based on evaluating a status of the drive write operations.

20. A method, implemented as a set of instructions stored on a non-transitory computer readable medium and executable by a processor, for completing write operations to a drive pool of a data storage system, the method comprising:
receiving a stripe write request from a host, the stripe write request including a request to write a stripe of data to a plurality of disk drives of the drive pool;
based on the received stripe write request, issuing a plurality of commands to the plurality of disk drives to initiate a plurality of drive write operations for writing the stripe of data to the plurality of disk drives;
starting a write timer, the write timer being programmed to run for a pre-determined time interval, the write timer being configured to time-out when the pre-determined time interval expires;
when a first sub-set of the plurality of drives have completed their drive write operations before expiration of the time interval, and when at least one drive write operation of a second sub-set of the plurality of drives is pending when the time interval expires, and when a number of drives included in the second sub-set is at or below a redundancy threshold number for the drive pool, classifying the stripe write as complete and providing an indication to the host that the stripe write is complete;
providing an entry to a pending writes queue identifying the at least one pending drive write operation, the pending writes queue being located in a persistent storage area of the data storage system; and
when the at least one pending drive write operation has completed, removing the entry from the pending writes queue,
wherein the drive pool is a non-zero redundancy level Redundant Array of Inexpensive Disks (RAID) drive pool.

* * * * *